US012278548B2

(12) United States Patent
Cuenot et al.

(10) Patent No.: US 12,278,548 B2
(45) Date of Patent: Apr. 15, 2025

(54) COMPACT SMART ELECTRIC MOTOR

(71) Applicant: SAFRAN ELECTRICAL & POWER, Blagnac (FR)

(72) Inventors: Jérémy Cuenot, Blagnac (FR); Olivier Berry, Blagnac (FR); Julie Danchin, Blagnac (FR); Laurent Cartailler, Blagnac (FR); Jean-Michel Bernard Paul Chastagnier, Blagnac (FR); José Soler, Blagnac (FR); Philip Indge, Blagnac (FR); Samuel Lewis, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 475 days.

(21) Appl. No.: 17/299,872

(22) PCT Filed: Dec. 2, 2019

(86) PCT No.: PCT/FR2019/052895
§ 371 (c)(1),
(2) Date: Jun. 4, 2021

(87) PCT Pub. No.: WO2020/115417
PCT Pub. Date: Jun. 11, 2020

(65) Prior Publication Data
US 2022/0077749 A1 Mar. 10, 2022

(30) Foreign Application Priority Data
Dec. 5, 2018 (FR) ........................ 1872383

(51) Int. Cl.
H02K 9/06 (2006.01)
H02K 9/14 (2006.01)
(Continued)

(52) U.S. Cl.
CPC ............... H02K 9/06 (2013.01); H02K 9/14 (2013.01); H02K 11/02 (2013.01); H02K 11/33 (2016.01)

(58) Field of Classification Search
CPC . H02K 9/06; H02K 9/14; H02K 11/02; H02K 11/33
(Continued)

(56) References Cited

U.S. PATENT DOCUMENTS 5,500,563 A 3/1996 Kawaguchi et al.
5,825,109 A * 10/1998 Jeske ..................... H02K 5/225
310/71
(Continued)

FOREIGN PATENT DOCUMENTS

CN 108336867 A1 7/2018
DE 19606487 A1 * 8/1997 ........... F04D 25/082
(Continued)

OTHER PUBLICATIONS

DE 19606487 A1 Machine Translation (Year: 1997).*
(Continued)

Primary Examiner — Quyen P Leung
Assistant Examiner — Masoud Vaziri
(74) Attorney, Agent, or Firm — Bookoff McAndrews, PLLC

(57) ABSTRACT

A smart motor having an electromechanical converter endowed with a rotating portion defining an axial direction and a radial direction, an electronic control unit, an electrical filter and a housing having a cooling device, the electromechanical converter, the electronic control unit and the filter being accommodated inside the housing, and the electronic control unit comprising an electrical converter configured to power the electromechanical converter. The housing is
(Continued)

cylindrical and the electrical converter includes one or more electronic board(s) forming a hollow cylinder.

15 Claims, 3 Drawing Sheets

(51) Int. Cl.
  *H02K 11/02* (2016.01)
  *H02K 11/33* (2016.01)
(58) Field of Classification Search
  USPC .......................................................... 310/71
  See application file for complete search history.

(56) References Cited

U.S. PATENT DOCUMENTS

| | | | | |
|---|---|---|---|---|
| 7,105,976 B2* | 9/2006 | Stewart | .................. | H02K 11/33 310/90 |
| 7,872,383 B2* | 1/2011 | Dubuc | .................. | H02K 5/225 310/71 |
| 2003/0173847 A1* | 9/2003 | Doeffinger | ........... | H02K 19/365 310/102 R |
| 2006/0071565 A1* | 4/2006 | Stewart | .................. | H02K 11/33 310/216.074 |
| 2009/0295325 A1* | 12/2009 | Sekine | ..................... | F16H 1/16 310/71 |
| 2010/0327678 A1* | 12/2010 | Yamasaki | .............. | H02K 11/05 310/68 D |
| 2012/0098391 A1* | 4/2012 | Yamasaki | .............. | H02K 11/33 310/68 D |
| 2013/0285513 A1 | 10/2013 | Tani et al. | | |
| 2014/0091654 A1* | 4/2014 | Biffard | ..................... | H02K 3/04 310/71 |
| 2015/0351599 A1* | 12/2015 | Park | ...................... | F04D 29/541 310/68 B |
| 2021/0194303 A1* | 6/2021 | Pfannschmidt | .......... | H02K 1/32 |

FOREIGN PATENT DOCUMENTS

| | | |
|---|---|---|
| JP | S5545677 U | 3/1980 |
| WO | 2005043720 A1 | 5/2005 |

OTHER PUBLICATIONS

International Search Report in corresponding Application No. PCT/FR2019/052895, dated Feb. 18, 2020, (5 pages).
French Search Report in corresponding French Application No. FR1872383, dated Jul. 17, 2019 (2 pages).
1 First Search issued in corresponding Chinese Application No. 2019800809106, mailed Aug. 25, 2023.

* cited by examiner

[Fig. 1]
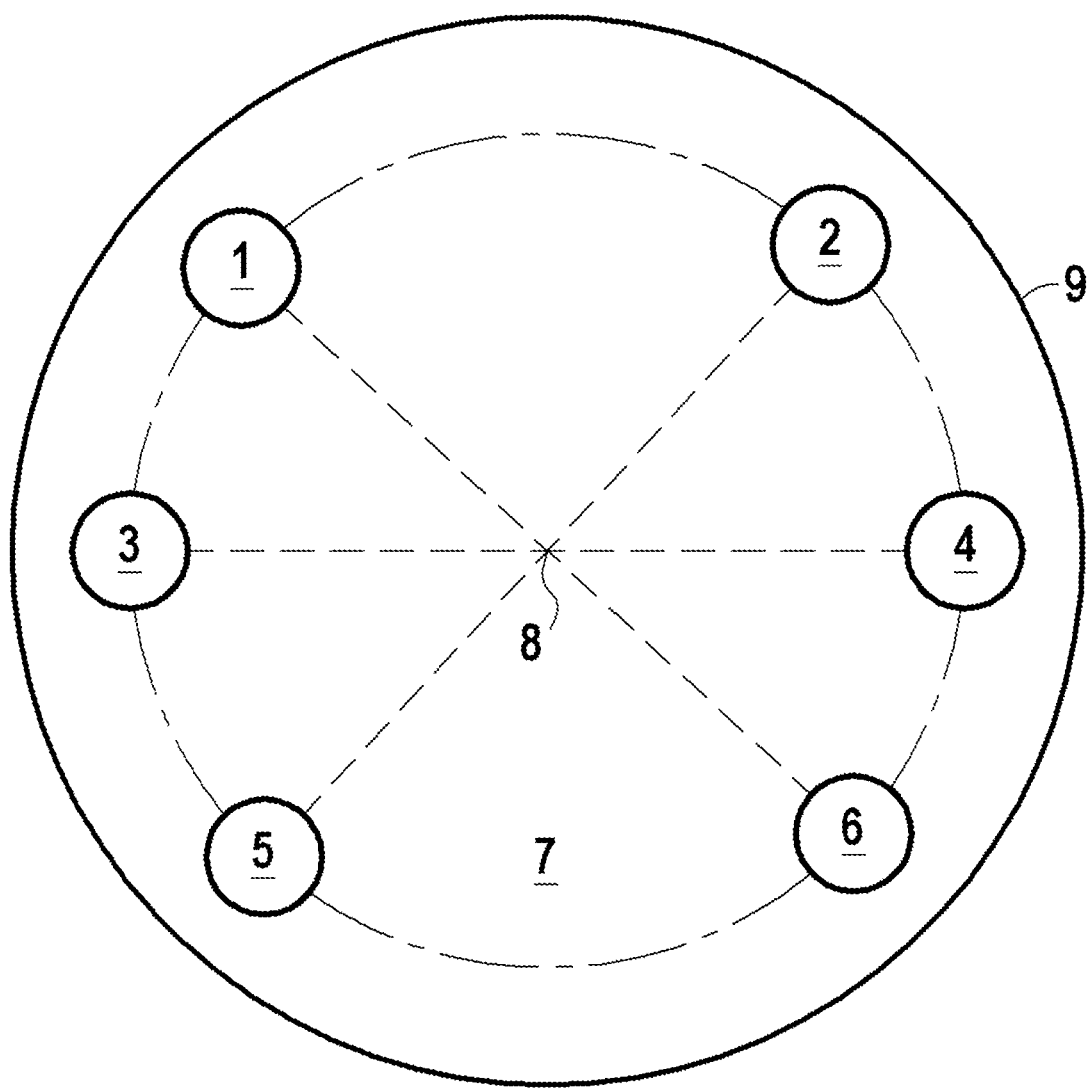

[Fig. 2]
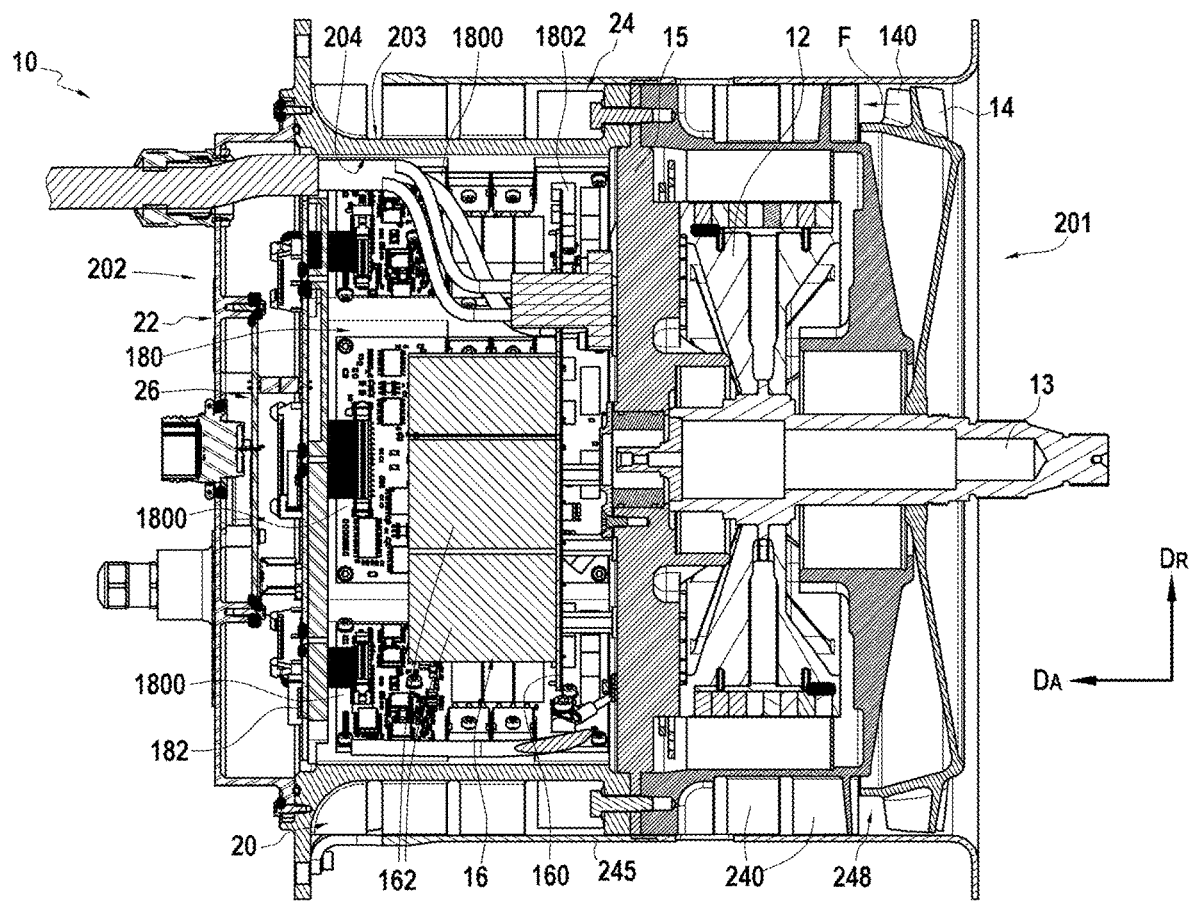

[Fig. 3]
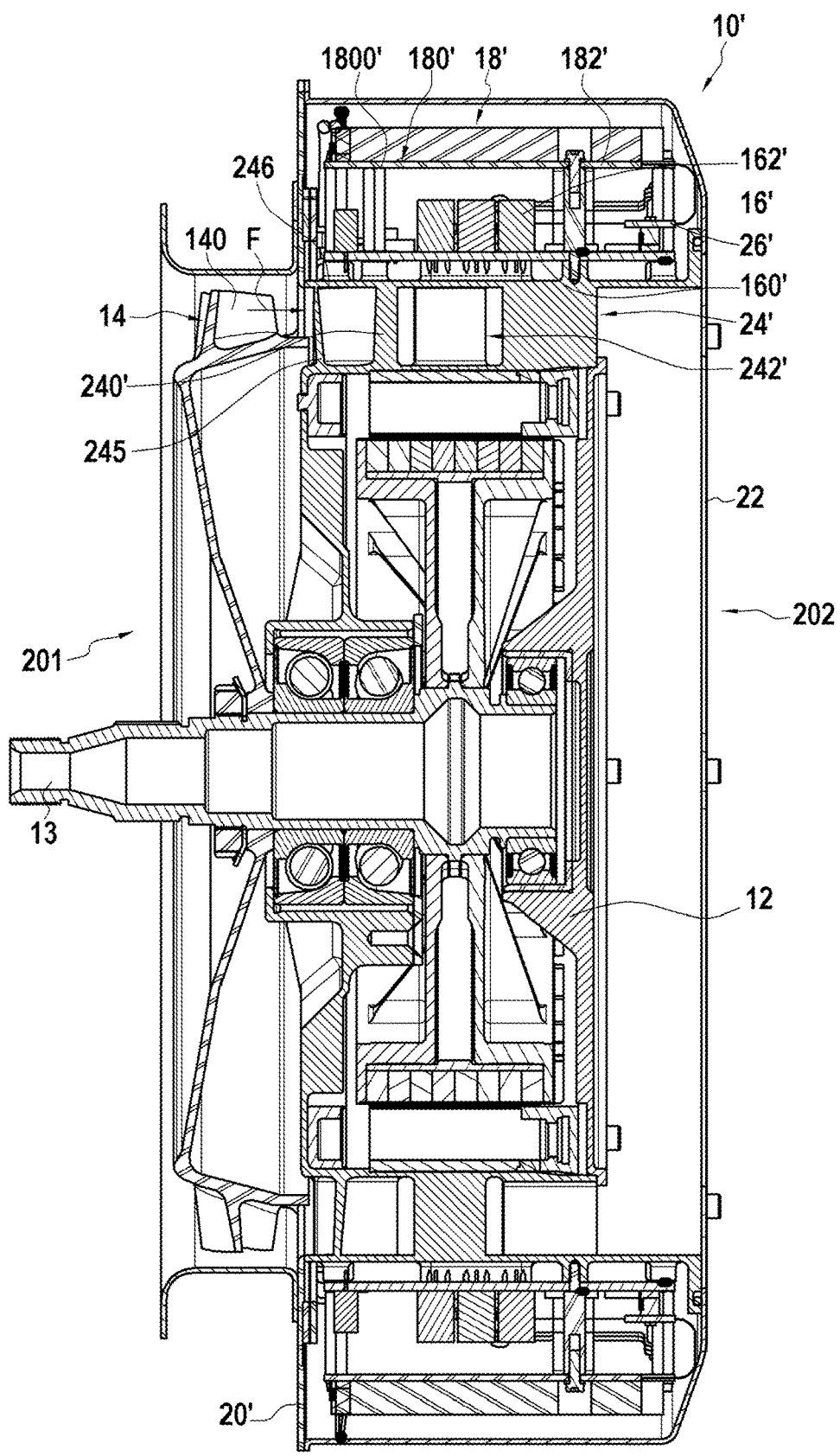

COMPACT SMART ELECTRIC MOTOR

CROSS-REFERENCE TO RELATED APPLICATION(S)

This application is the U.S. national phase entry under 35 U.S.C. § 371 of International Application No. PCT/FR2019/052895, filed on Dec. 2, 2019, which claims priority to French Patent Application No. 1872383, filed on Dec. 5, 2018.

TECHNICAL FIELD

The invention relates to a smart electric motor, particularly for an aircraft, and more particularly to the architecture of an electric motor with multiple decoupled windings with strong mechanical integration.

BACKGROUND

Vertical takeoff and landing aircraft are used more and more, particularly in intra-urban and inter-urban transportation of merchandise or of persons.

The revolution in aerial transport has given birth to a growing need for the propulsion of the new aircraft, VTOL ("Vertical Take-Off and Landing") for example. Electrical energy is the main vector of this revolution, due to its flexibility of implementation, its efficiency (only the necessary energy is produced), its reliability (limited maintenance) and mainly by the potential reduction in mass and volume which it generates relative to a conventional propulsion system (thermal with hydraulic or pneumatic energy distribution). On the other hand, the current power of on-board electric motors does not allow competition with the power developed by a single heat engine; it is therefore necessary to multiply the number of electric motors.

It is therefore easy to understand that the mechatronic integration constraints (mass and volume) of the electric motor, controller (power electronics and control electronics), filtering and cooling system assembly is a key problem of this change, particularly for preserving a propulsion assembly of which the mass and the bulk remain small.

Among the existing technical solutions for motors with integrated controllers, or smart motors, there are smart motors with fluid cooling, for example with water cooling. The power density of the motor alone, without its cooling system, can be high, but its implementation is complex due to an independent cooling system.

A smart motor architecture is known with multiple independent windings integrating a gearbox and in which each winding is powered by an H bridge converter, but the input filtration is not integrated. The smart motor comprises a synchronous machine and an electronic unit successively positioned in an axial direction of a housing, inside this housing, the housing being equipped with a cooling device.

In addition, a configuration called "direct drive," corresponding to the direction transmission of the mechanical torque, i.e. with no gearbox, offers, compared to smart motors integrating a gearbox, a gain with respect to maintenance operations of the gearbox and a gain in reliability of the smart motor.

DISCLOSURE OF THE INVENTION

The invention aims to offer a solution allowing solving the integration constraints mentioned above, particularly by proposing a smart motor, the mass and volume of which are minimized while allowing simple access to the elements for the maintenance of the motor and by reducing electromagnetic interference while dispensing with the use of a mechanical converter.

In a first object of the invention, a smart motor is proposed comprising an electromechanical converter endowed with a rotating portion defining an axial direction and a radial direction, an electronic control unit, electrical filtering means and a housing comprising a cooling device. The electromagnetic converter, the electronic control unit and the filtering means are accommodated inside the housing (20), and the electronic control unit comprises a static electrical converter configured to power the electromechanical converter.

According to a general feature of the first object of the invention, the housing is cylindrical and the electrical converter comprises one or more power electronics board(s) forming a hollow cylinder.

In other words, the electrical converter forms a single hollow cylinder from a single electronic board having a tubular shape or from a plurality of electronic boards positioned together in the shape of a hollow cylinder.

The configuration of the electronic control unit or of a tubular electronic board or of a ring formed by a plurality of electronic boards allows moving the power electronics components of the electronic control unit as close as possible to the wall of the housing on which the cooling device is mounted, and thus to maximize the cooling of the power electronics components which are heat sources.

Advantageously, the electromechanical converter, the electrical converter and the filtering means can be physically distinct from one another and coaxial in the axial direction.

The spatial distinction of the different elements in the form of distinct modules or distinct boards allows segmenting the different portions of the smart motor, on the one hand, in order to limit electromagnetic perturbations of sensitive components so and, on the other hand, in order to make the different portions composing the intelligent motor interchangeable, depending in particular on the needs or the intended applications, by means of technological bricks developed separately.

The axial and modular integration thus has the advantage of proposing simple and easy assembly in progressive steps.

The integration of the different elements of the smart motor by means of different sub-items allows distinctly separating the different fields: different power levels, different technical fields (electrotechnology, power electronics, digital electronics, etc.).

Preferably, the electrical converter comprises connection terminals extending in a radial plane orthogonal to said axial direction, allowing electrical connection of the filtering means to the electrical converter, the connection terminals including a corrugated portion providing elasticity to the connection terminal allowing a certain freedom of movement to be offered to the filtering means.

The integration is facilitated by the specific orientation of the set of electrical connections between the input filtering and the static converter so as to gain access to it by the back of the housing without the use of specific tools.

The motor can further comprise an impeller connected directly to the electromechanical converter via a mechanical transmission shaft, the electromechanical converter being positioned in the axial direction between the impeller and the electronic control unit, and the blades of the impeller being in fluid communication with said cooling device to be crossed by a flow of air delivered by the blades of the impeller.

The flow of air generated by the impeller driven by the rotation of the electromagnetic converter irrigates both the electromechanical converter and the electronic unit. The flow of air is self-maintained by the rotation of the electromagnetic converter. In addition, all the interconnections of the smart motor being positioned inside the housing, the flow of air circulating on the entire periphery of the housing does not undergo any fluid perturbation.

Advantageously, the electric filtering means can have a cylindrical shape. The cylindrical shape can have any base shape such as for example a circular base or a polygonal base.

Just like the electrical converter, the filtering means can comprise one or more electronic filtering board(s) forming a tube or a tubular assembly.

This tubular formation of the electric filtering means allows facilitating the allocation and the distribution of the filtering among the power elements of which the number can easily be increased so as to be in accordance with the number of phases of the electromagnetic converter. The formation of the filtering means offers modularity in the number of connections and the possibility of selecting the localization of the filtering, in centralized mode or in distributed mode.

Moreover, this allows uniformly distributing the currents and the losses in the filtering means, regardless of the number of phases of the electromechanical converter.

The electric filtering means can advantageously be positioned inside the hollow cylinder formed by the electrical converter.

The integration of the power elements of the smart motor, i.e. the electrical converter, inside the housing of the smart motor in a shape coinciding with the cylindrical aspect of the housing and of the electrical converter, allows integrating the electric input filtering of the smart motor in the housing as close as possible to the perturbing elements, such as the power switches of the power electronics boards, which allows reducing the inductances of the cabling and thus reducing the mass and the volume of the filtering.

The filtering means can also be integrated into the hollow cylinder, in a radial plane or in a ring the axis of revolution of which corresponds to the axis of revolution of the hollow cylinder of the electrical converter, or even outside the hollow cylinder on a ring the axis of revolution of which corresponds to the axis of revolution of the hollow cylinder of the electrical converter.

The electrical converter can advantageously be positioned directly following the electromechanical converter in the axial direction, and the cooling device can comprise fins protruding in the radial direction from a radially external wall of the housing, the cooling device extending in the axial direction around the electrical converter and the electromechanical converter.

The axial integration of the electronic unit and of the electrical machine, i.e. of the electromechanical converter, allows communalizing the cooler, potentially over the entire smart motor.

The placement of the electrical converter directly following the electromechanical converter in the housing of the smart motor further allows reducing the length of the electrical connections between the electrical converter and the electromagnetic converter, and thus dispense with interphase inductances. In known smart motors, interphase inductances are used to filter the electromagnetic perturbations caused by the electrical converter of the electronic control unit.

Moreover, the circular topology of the electrical converter and the circular shape of the electromagnetic converter as well as the successive arrangement of the two converters in the axial direction offer the possibility of having a polyphase connection of the phases of the electromechanical converter. This topology effectively allows favoring the use of several phases and therefore to distribute as well as possible the Joule effect losses of the electromagnetic converter and of the static electrical converter.

Advantageously, the electronic control unit can further comprise a control module of the electromechanical converter, the electrical converter being positioned in the axial direction between the electromechanical converter and the control module.

Advantageously, the smart motor can further comprise a supervision unit accommodated inside the housing and in communication with said control module, said control module being positioned in the axial direction between the electrical converter and the supervision unit.

The integration of control electronics at an end of the smart motor opposite to the end bearing in particular the electromechanical converter allows, on the one hand, to guard it against high electrical or electromagnetic fields generated by polluting components such as power switches and, on the other hand, to facilitate the maintenance by a side of the housing opposite to the end at which the so electromechanical converter is mounted.

In addition, the housing can have a hollow cylindrical shape closed on one side of the axial direction ($D_A$) by a cover made of thermally conducting material, the electronic control board and/or the supervision unit being positioned in the axial direction directly facing said cover.

The proximity of a support which can be metallic allows draining the heat flow of the electronic components via thermal interfaces and thus increasing the power level at equivalent volume/mass, i.e. increasing the power density.

Advantageously, the hollow cylinder formed by the electrical converter can be positioned in the radial direction between the electromechanical converter and the housing.

The filtering means can advantageously be positioned in the radial direction between the electrical converter and the housing.

Advantageously, the electronic control unit can further comprise a control module of the electromechanical converter positioned in the radial direction between the filtering means and the housing.

In addition, the smart motor can further comprise a supervision unit accommodated inside the housing and in electronic communication with said control module, said supervision unit being positioned in the radial direction between the control module and the housing.

According to another object of the invention, a propulsion system for an aircraft is proposed comprising at least one smart motor as defined above.

BRIEF DESCRIPTION OF THE DRAWINGS

The invention will be better understood upon reading the following, by way of indication but without limitation, with reference to the appended drawings in which:

FIG. 1 shows schematically a multi-rotor aircraft equipped with a propulsion system according to one embodiment of the invention.

FIG. 2 shows schematically a section view of a smart motor according to a first embodiment of the invention.

FIG. 3 shows schematically a section view of a smart motor according to a second embodiment of the invention.

DESCRIPTION OF THE EMBODIMENTS

A multi-rotor aircraft 7 is shown schematically in FIG. 1, equipped with a propulsion system 9 according to one embodiment of the invention. In the example illustrated in FIG. 1, the propulsion system 9 comprises six rotors 1 to 6 distributed over the multi-rotor phantom line circle. The rotors 1 to 6 form three pairs of rotors, the rotors of the same pair being symmetrically opposed with respect to a center of symmetry 8. The first pair of rotors comprises rotors 1 and 6, the second pair of rotors comprises rotors 2 and 5, the third pair of rotors comprises rotors 3 and 4. In addition, the propulsion system 9 comprises one smart motor 10 for each rotor 1 to 6.

A section view of a smart motor 10 is shown schematically in FIG. 2, according to a first embodiment of the invention.

The smart motor 10 illustrated in FIG. 2 comprises an electrical machine 12 acting as an electromechanical converter and endowed with a rotating portion defining an axial direction $D_A$ and a radial direction $D_R$. FIG. 2 is a section view in a plane comprising the axial direction $D_A$ and the radial direction $D_R$.

The smart motor 10 further comprises an impeller 14, electrical filtering means 16, an electronic control unit 18, and a housing 20 or casing, inside which are accommodated the electrical machine 12, the electronic control unit 18 and the filtering means 16.

The impeller 14 is mechanically coupled to the electrical machine 12 by a transmission shaft 13, which allows the electrical machine to drive the impeller 14.

The housing 20 has a hollow cylindrical shape with, in the embodiment illustrated in FIG. 2, a circular cross section. The axis of revolution of the housing 20 is congruent with the axis of rotation $D_A$ of the electrical machine 12 which is congruent with the axis of rotation of the transmission shaft 13 and of the impeller 14.

The housing 20 comprises, in the axial direction $D_A$, a first end 201 and a second end 202 opposite to the first end 201. In the axial direction $D_A$, the housing 20 is closed at its first end 201 by the impeller 14, and at its second end 202 by a cover 22.

The housing 20 comprises a cooling device 24 mounted on a radially external surface 203 of the housing 20. The terms "internal" and "external," and "interior" and "exterior" are used here with reference to the radial direction $D_R$ in the smart motor 10.

The cooling device 24 comprises a set of fins 240 extending radially outward from the radially external surface 203 of the housing 20, and thus forms a radiator allowing heat exchange between the fins 240 and a flow F of air crossing the fins 240 of the cooling device 24. The flow F of cooling air is generated and fed by the blades 140 of the impeller 14 driven by the electrical machine 12, and is thus self-maintained.

In the embodiment illustrated in FIG. 2, the cooling device 24 further comprises a cylindrical cooling casing 245 positioned around the cooling fins 240. The cooling casing 245 thus defines, with the radially external surface 203 of the housing 20, a cooling stream 248 in which the cooling air flow F is channeled.

In one variant, the smart motor could not comprise impellers and cooling casings in order to reduce the mass of the smart motor. The smart motor would then be cooled by the flow of air generated by the rotor of the aircraft, the rotor conventionally consisting of a propeller mechanically connected directly to the mechanical rotation shaft of the smart motor.

In the embodiment illustrated in FIG. 2, which shows a so-called "axial" configuration of the smart motor 10 according to the invention, the smart motor 10 comprises a housing 20 including a cooling device, a driving portion including the electrical machine 12, the impeller 14 and the transmission shaft 13, and an electronic portion separated in the axial direction from the driving portion, the electronic portion comprising in particular the electrical filtering means 16 and the control unit 18.

To physically separate the driving portion and the electronic portion, the smart motor 10 comprises an internal wall 15 extending in a radial plane comprising the radial direction $D_R$ and orthogonal to the axial direction $D_A$ and attached to a radially internal surface 204 of the housing 20. The electrical machine 12 is positioned inside the housing 20 upstream of the internal wall 15, while the electrical filtering means 16 and the electronic control unit 18 of the electronic portion are positioned downstream of the internal wall 15.

The terms "upstream" and "downstream" are used here with reference to the direction of flow of cooling air delivered, shown by the arrow F in FIG. 2.

The electronic control unit 18 comprises a static electrical converter 180 configured to power the electrical machine 12.

The electrical converter 180 is placed directly following the electrical machine 12 in the housing 20 of the smart motor 10, which allows reducing the length of the electrical connections between the electrical converter 180 and the electrical machine 12 passing through the internal wall 15 and thus dispense with interphase inductances.

The electrical converter 180 comprises, in the embodiment illustrated in FIG. 2, six power electronics boards 1800 arranged together to form a hollow cylinder with a hexagonal base coaxial with the electrical machine 12.

In a variant in which the electrical converter would comprise eight electronic boards, it would form a cylinder with an octagonal base. If it comprised five electronic boards, it would form a cylinder with a pentagonal base. In a variant in which the electrical converter would comprise a single electronic board, it could form a hollow cylinder with a circular base with a power electronics board having an annular shape, possibly with a first end and a second end facing one another in a direction orthogonal to the radial direction $D_R$ and to the axial direction $D_A$.

The electronic boards 1800 are positioned facing the internal surface 204 of the housing 20 to maximize cooling of the electronic power components.

The filtering means 16 comprise an electronic filtering board 160 on which are mounted capacitors 162.

In the embodiment illustrated in FIG. 2, the electronic filtering board 160 of the filtering means 16 has a hexagonal shape allowing its insertion into the hollow cylinder formed by the electronic boards 1800 of the electronic converter 180. The hexagonal shape of the electronic board 160 cooperates with the hexagonal cross section of the hollow cylinder formed by the power electronic boards 1800 of the electrical converter 180, which allows adjusting the electronic filtering board 160 as close as possible to the electronic power boards 1800. The capacitors 162 and the electronic board 160 are accommodated in the hollow cylinder of the electrical converter 180.

Each electronic board 1800 of the electrical converter 180 comprises two connection terminals 1802 extending in a radial plane comprising the radial direction $D_R$ and orthogonal to said axial direction $D_A$ allowing electrically connecting the electronic filtering board 160 to the power electronic boards 1800 of the electrical converter 180. Each connection terminal 1802 includes a corrugated portion which provides it with elasticity which allows offering a certain freedom of movement to the electronic filtering board 160 with respect to the electrical converter 180. The integration of the electrical filtering in the housing closest to the perturbing elements, such as the power switches of the electronic power boards 1800, allow reducing the cabling inductances and thus reducing the mass and the volume of the filtering.

In addition, the electronic control unit 18 comprises an electronic control board 182 configured to control the operation of the electrical machine 12. In the embodiment illustrated in FIG. 2, the electronic control board 182 comprises a hexagonal shape extending in a radial plane comprising the radial direction $D_R$ and orthogonal to the axial direction $D_A$ and parallel to the filtering board 160.

The smart motor 10 further comprises an electronic supervision board 26 accommodated inside the housing 20 and in communication with the electronic control board 182. The electronic supervision board 26 extends in a radial plane comprising the radial direction $D_R$ and orthogonal to the axial direction $D_A$ and parallel to the filtering board 160. The electronic supervision board 26 is positioned facing the cover 22, between the cover 22 and the electronic control board 182. The electronic supervision board 26 allows in particular powering the electronic control boards 1800 and creating the interface of the smart motor 10 with an external supervisor.

In this axial configuration, the cooling device 24 is communalized between the electrical machine 12 and the electronic portion of the smart motor 10 comprising the filtering means 16 and the electronic control unit 18. The flow F of cooling air delivered by the blades 140 of the impeller 14 circulates along the radially external surface 203 of the housing 20 and fluidly communicates with the fins 240 of the cooling device 24. The radially external surface 203 of the housing 20 recovers both the heat generated by the electrical machine 12 and the heat generated by the electronic portion, particularly by the power converter 180, and transfers the calories to the flow F of cooling air, particularly via the fins 240, the air flow F then exhausting the calories outside the smart motor 10.

A section view of a smart motor 10' according to a second embodiment of the invention is illustrated schematically in FIG. 3.

Elements identical to the first embodiment illustrated in FIG. 2 bear the same numerical references.

FIG. 3 is a section view in a plane comprising the axial direction $D_A$ and the radial direction $D_R$.

In this second embodiment, the impeller 14 is coupled mechanically to the electrical machine 12 via the transmission shaft 13 and the housing 20' has a hollow cylindrical shape with a circular cross section, the cylindrical shape being less long in the axial direction $D_A$ and larger in the radial direction $D_R$ than in the first embodiment illustrated in FIG. 2. The axis of revolution of the housing 20' is congruent with the axis of rotation $D_A$ of the electrical machine 12, which is congruent with the axis of rotation of the transmission shaft 13 and of the impeller 14.

The electrical machine 12, the electrical filtering means 16' and an electronic control unit 18' are accommodated inside the housing 20'.

In the second embodiment illustrated in FIG. 3, the cooling device 24' of the housing 20' differs from the first embodiment illustrated in FIG. 2 in that it is created inside the housing 20' in the shape of a radial hollow internal ring, coaxial with the housing 20'. The cooling device 24' thus forms a ring internal to the housing 20' and coaxial with the axis of revolution of the housing 20'. The ring has a circular shape in a radial plane comprising the radial direction $D_R$ and orthogonal to the axial direction $D_A$, and a thickness in the radial direction $D_R$. The internal ring forming the cooling device 24' comprises passages 242' provided in the thickness of the ring, the passages 242' allowing a flow F of cooling air delivered by the blades 140 of the impeller 14 to cross the cooling device 24' in the axial direction $D_A$. The cooling device 24' further comprises studs or pillars 240' of different lengths in the axial direction $D_A$, extending in the radial direction $D_R$ between an internal wall 245 and an external wall 246 of the ring.

In the embodiment illustrated in FIG. 3, which shows a so-called "radial" configuration of the smart motor 10' according to the invention, the cooling device 24' forms a fixed internal wall separating the housing 20' into two radial zones, an internal radial zone receiving the electrical machine 12 and an external radial zone receiving the electronic control unit 18' and the filtering means 16'.

The filtering means 16' comprise one or more electronic filtering board(s) 160' which form a hollow cylinder, i.e. a ring, positioned inside the external radial zone of the housing 20', i.e. positioned radially outside the cooling device 24'. In the embodiment illustrated in FIG. 3, the filtering means 16' comprise six electronic filtering boards 160' arranged together to form a hollow cylinder with a hexagonal base coaxial with the electrical machine 12.

In one variant where the filtering means 16' would comprise a single electronic filtering board 160', they could form a hollow cylinder with a circular base with an electronic filtering board 160' having an annular shape, possibly with a first and a second end facing one another in a direction orthogonal to the radial direction $D_R$ and to the axial direction $D_A$.

Likewise, the electronic control unit 18' comprises an electrical power converter 180' which includes one or more electronic control board(s) 1800' which form a hollow cylinder, i.e. a ring, positioned inside the radially external zone of the housing 20' radially outside the ring of the filtration means 16'. In other words, the ring of the electrical converter 180' is positioned radially between the ring of the filtration means 16' and the outer perimeter of the housing 20. In the embodiment illustrated in FIG. 3, the electrical converter 180' comprises six electronic power boards 1800' arranged together to form a hollow cylinder with a hexagonal base coaxial with the electrical machine 12.

In one variant where the electrical converter 180' would comprise a single electronic power board 1800', the converter could form a hollow cylinder with a circular base with an electronic power board 1800' having an annular shape, possibly with a first end and a second end facing one another in a direction orthogonal to the radial direction $D_R$ and to the axial direction $D_A$.

In addition, the electronic control unit 18' of the smart motor 10' comprises a control board 182' configured to control the electrical machine 12 and positioned, in the second embodiment illustrated in FIG. 3, in the radial direction $D_R$ between the filtering means 16' and the housing 20' and in the axial direction $D_R$, downstream of the electronic power boards 1800', in other words between the electronic power boards 1800' and the cover 22'.

The smart motor 10' further comprises an electronic supervision board 26' accommodated inside the housing 20' and in communication with the control board 182'. The electronic supervision board 26' has an annular shape and is positioned in the radial direction $D_R$ between the electronic control board 182' and the electronic filtering board 160'.

In one variant, the electronic supervision board 26 extends in a radial plane comprising the radial direction $D_R$ and orthogonal to the axial direction $D_A$. The electronic supervision board 26 is positioned facing the cover 22', the cover 22' closing the housing 20' in the axial direction $D_A$ on a side of the electrical machine 12 opposite to the side of the electrical machine 12 positioned facing the impeller 14. In other words, the electronic supervision board 26 can be positioned between the cover 22' and the electrical machine 12.

In this radial configuration, the cooling device 24' is communalized between the electrical machine 12 and the electronic portion of the smart motor 10' comprising the filtering means 16' and the electronic control unit 18'. The flow F of cooling air delivered by the blades 140 of the impeller 14 circulates through the passages 242' and fluidly communicates with the pillars 240' and the internal and external walls 245 and 26 of the cooling device 24'. The internal and external walls 245 and 246 respectively recover the heat generated by the electrical machine 12 and the heat generated by the electronic portion, in particular by the power converter 180', and transfer the calories to the cooling air flow F in particular via the pillars 240', the air flow F then exhausting the calories from the smart motor 10'.

The smart motor according to the invention has an architecture allowing reducing its mass and its volume while allowing simple access to the elements for the so maintenance of the motor and reducing electromagnetic interference.

The invention claimed is:

1. A smart motor comprising:
an electromechanical converter endowed with a rotating portion defining an axial direction and a radial direction, an electronic control unit, an electrical filtering means, and a housing comprising a cooling device including fins, wherein:
the electromechanical converter, the electronic control unit, and the filtering means are accommodated inside the housing such that the fins surround the electromechanical converter, the electronic control unit, and the filtering means;
the electronic control unit comprises an electrical converter configured to power the electromechanical converter;
the housing is cylindrical; and
the electrical converter comprises one or more electronic boards disposed inside the housing; and
wherein the smart motor further comprises an impeller connected directly to the electromechanical converter via a mechanical transmission shaft, the electromechanical converter being positioned in the axial direction between the impeller and the electronic control unit, blades of the impeller surrounded by the housing, ends of the blade of the impeller overlapping the fins in the radial direction, and the blades of the impeller being in fluid communication with the fins so that the fins are crossed by a flow of air delivered by the blades of the impeller, thereby cooling the electromechanical converter, the electronic control unit, and the filtering means surrounded by the fins.

2. The smart motor according to claim 1, wherein the electromechanical converter, the electrical converter, and the filtering means are physically distinct from one another and coaxial in the axial direction.

3. The smart motor according to claim 1, wherein the electrical converter comprises connection terminals extending in a radial plane orthogonal to the axial direction allowing electrical connection of the filtering means to the electrical converter, the connection terminals including a corrugated portion providing elasticity to the connection terminal allowing a certain freedom of movement to be offered to the filtering means.

4. The smart motor according to claim 1, wherein the electrical filtering means have a cylindrical shape.

5. The smart motor according to claim 1, wherein the electrical filtering means are positioned within a perimeter formed by the electrical converter.

6. The smart motor according to claim 1, wherein the electrical converter is positioned immediately following the electromechanical converter in the axial direction, and the fins protruding in the radial direction from a radially external wall of the housing, the cooling device extending in the axial direction around the electrical converter and the electromechanical converter.

7. The smart motor according to claim 6, wherein the electronic control unit further comprises a control module of the electromechanical converter, the electrical converter being positioned in the axial direction between the electromechanical converter and the control module.

8. The smart motor according to claim 7, further comprising a supervision unit accommodated inside the housing and in communication with said control module, said control module being positioned in the axial direction between the electrical converter and the supervision unit.

9. The smart motor according to claim 8, wherein the housing has a hollow cylindrical shape closed on one side of the axial direction by a cover made of thermally conducting material, the control module and/or the supervision unit being positioned in the axial direction directly facing said cover.

10. A propulsion system for an aircraft comprising at least one smart motor according to claim 1.

11. A smart motor comprising:
an electromechanical converter endowed with a rotating portion defining an axial direction and a radial direction, an electronic control unit, an electrical filter, and a housing comprising a cooling device, wherein:
the electromechanical converter, the electronic control unit, and the electrical filter are accommodated inside the housing such that the cooling device surrounds the electromechanical converter, the electronic control unit, and the electrical filter;
the electronic control unit comprises an electrical converter configured to power the electromechanical converter;
the housing is cylindrical; and
the electrical converter comprises one or more electronic boards disposed inside the housing; and
wherein the smart motor further comprises an impeller connected directly to the electromechanical converter via a mechanical transmission shaft, the electromechanical converter being positioned in the axial direction between the impeller and the electronic control unit, and blades of the impeller overlapping fins of the cooling device and being in fluid communication with the cooling device so that the cooling device is crossed by a flow of air delivered by the blades of the impeller, thereby cooling the electromechanical converter, the electronic control unit, and the electrical filter surrounded by the cooling device.

12. The smart motor according to claim 1, wherein the electrical filtering means comprises one or more electronic filtering boards.

13. The smart motor according to claim 1, wherein the electromechanical converter is associated with a circular shape and the electrical converter is associated with a circular base.

14. The smart motor according to claim 11, wherein the electrical filter comprises one or more electronic filtering boards.

15. The smart motor according to claim 11, wherein the electromechanical converter is associated with a circular shape and the electrical converter is associated with a circular base.

\* \* \* \* \*